United States Patent [19]

Strenger

[11] 4,163,510
[45] Aug. 7, 1979

[54] METHOD OF AND APPARATUS FOR DISPENSING A MULTI-CONSTITUENT BEVERAGE

[76] Inventor: Marshall C. Strenger, 450 Thorne, Lake Forest, Ill. 60045

[21] Appl. No.: 824,076

[22] Filed: Aug. 12, 1977

[51] Int. Cl.² ............................................. B67D 5/56
[52] U.S. Cl. .................................. 222/129.2; 222/95
[58] Field of Search ............... 222/129.1, 129.3, 129.4, 222/129.2, 94–96; 137/88, 98

[56] References Cited
U.S. PATENT DOCUMENTS

| 3,116,748 | 1/1964 | Wasson | 137/98 |
| 3,703,187 | 11/1972 | Booth | 222/129.2 X |

Primary Examiner—Stanley H. Tollberg
Attorney, Agent, or Firm—Lee & Smith

[57] ABSTRACT

A beverage dispenser includes a control device in communication with a source of base liquid and a source of flavoring constituent for generating a simultaneous flow of the base liquid and the flavoring constituent into a mixing nozzle. The flavoring constituent may be supplied in a portable packet which contains a measured quantity of constituent for making a specified beverage serving when mixed with a controlled quantity of base liquid. The control device may be actuated by tripping an actuator lever when a container is placed under the mixing nozzle for filling it with the mixed beverage. In one embodiment, actuation of the control device causes a flow of pilot fluid under pressure to a fluid operated control member in association with each source of base liquid and flavoring constituent. The pilot fluid may be supplied by the source of base fluid and may be expelled into the mixing nozzle.

29 Claims, 7 Drawing Figures

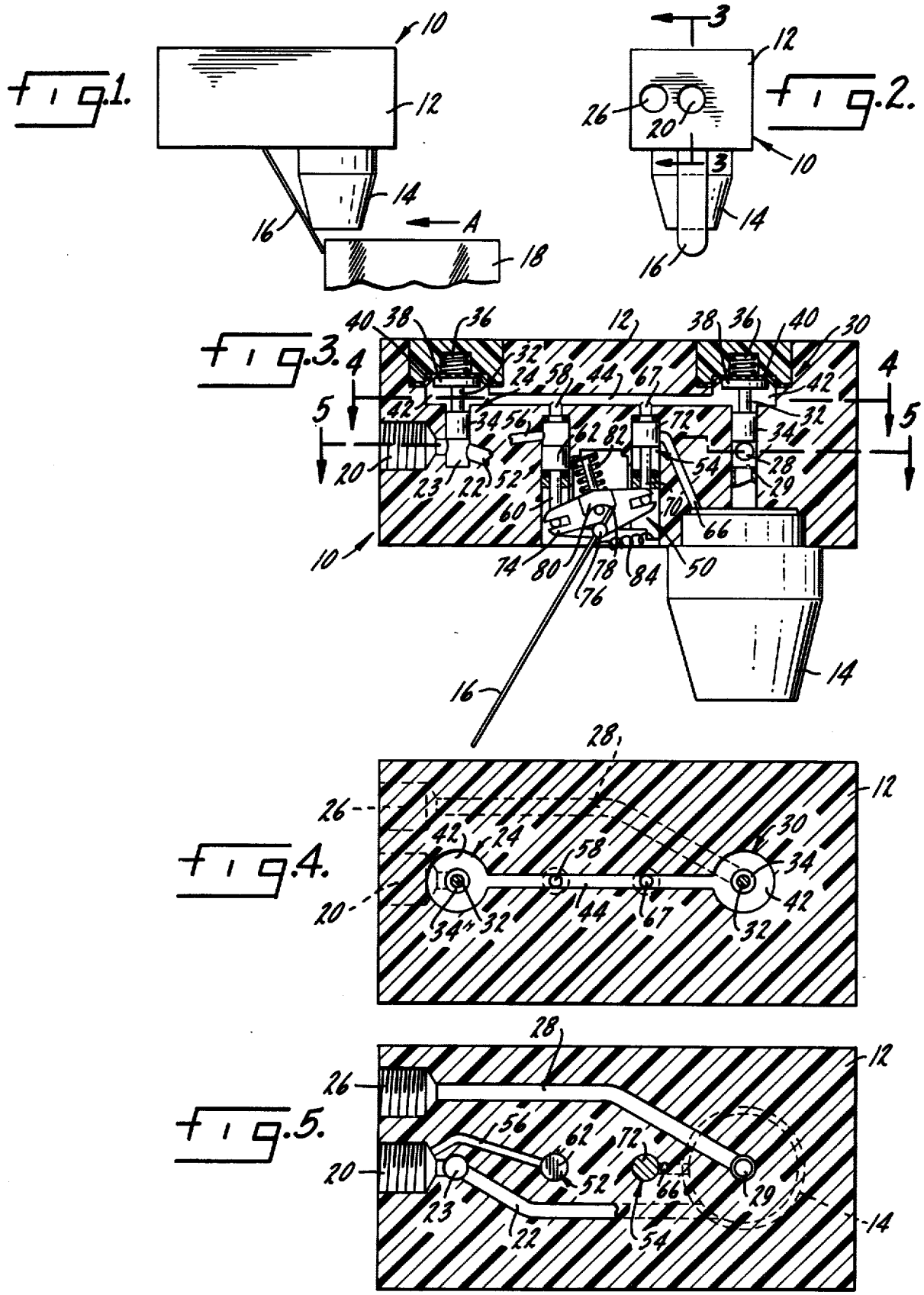

METHOD OF AND APPARATUS FOR DISPENSING A MULTI-CONSTITUENT BEVERAGE

BACKGROUND OF THE INVENTION

1. Field of the Invention

The present invention is directed to a beverage dispenser for mixing and dispensing a beverage consisting of measured quantities of a base liquid and a flavoring constituent and is particularly related to beverage dispensers wherein the flavoring constituent is provided in disposable, individual serving packets, and to snap-action fluid activated beverage dispensers wherein the flow of base liquid and flavoring constituent is controlled by a pilot flow of fluid under pressure.

2. Description of the Prior Art

It is known to provide a dispensing valve which employs carbonated water or the like as the base of many combination beverages, wherein it is required to activate the flow of carbonated water before the flow of the various flavoring constituents is introduced into a mixing nozzle and dispensed into a container as shown, by way of example, in U.S. Pat. No. 3,703,187. As there shown, depression of a push-button advances a seated valve member out of sealing engagement with an aperture which is in communication with a source of carbonated water. The carbonated water, which is introduced into a nozzle, is allowed to proceed through the aperture into a valving chamber from which it is communicated to a second valve, producing enough pressure to force a selected beverage syrup into the nozzle where it is mixed with the carbonated water.

A snap-action device has also been found to provide a desirable dispensing method because of the resulting acurracy of control of the flow of beverage components into a mixing and dispensing nozzle. However, a major drawback is encountered because known devices are electrically operated as shown, by way of example, in U.S. Pat. Nos. 3,163,177; 3,625,402 and 3,667,724. In each of these dispensers an electrically operated solenoid is employed to trigger the flow of beverage components into an outlet or nozzle from which the mixed beverage is dispensed into a suitable container. It is common to actuate these devices by providing a trip lever adjacent the nozzle which is engaged and tripped when the container is placed under the nozzle. The use of electrically operated solenoids requires a power source whenever the snap-action beverage dispensers are employed.

While the aforementioned pilot-flow system of U.S. Pat. No. 3,703,187 eliminates the need for the additional power source, it has the disadvantages overcome by snap-action devices.

It is also known to provide a beverage dispenser for mixing and dispensing a beverage consisting of measured quantities of a base liquid and a flavoring constituent wherein the base liquid and the flavoring constituent are simultaneously released into a mixing nozzle and dispensed, as disclosed in the foregoing patents. In these devices the flavoring constituent is supplied by an independent tube or flow path from one of a plurality of reservoirs to the mixing nozzle.

SUMMARY OF THE INVENTION

The present invention is directed to a beverage dispensing apparatus and method which combines the advantages of known snap-action dispensers with the advantages of fluid operated dispensers while overcoming the disadvantages inherent in both types of systems.

In the system disclosed herein, the beverage dispenser includes a plurality of flow control valves, one each associated with independent sources of a base liquid and one or more flavoring constituents which activate flow of the base liquid and the selected flavoring constituent into a mixing and dispensing nozzle when opened and inhibit said flow when closed. A trip lever or the like is associated with the device and when engaged, snaps from an "off" position to an "on" position for instantaneously activating a pilot flow of fluid to the flow valves for opening same. When disengaged, the trip lever returns to the "off" position and instantaneously inhibits the pilot flow, whereby the flow valves are closed and flow of flavoring constituent and base liquid to the nozzle is stopped.

The present invention permits use of the base liquid as the pilot fluid, and when the pilot flow is inhibited the pilot fluid may be exhausted into the mixing nozzle without fear of contaminating the mixed beverage. Of course, the means and method disclosed herein also permits use of other pilot fluids which may be returned to the pilot source between cycles.

The present invention also discloses a beverage dispenser wherein the flavoring constituent may be supplied in sealed, individual serving packets which are automatically released in a controlled manner into the mixing nozzle when the pilot flow is activated. This permits variety of selection of flavoring constituents without duplication of equipment, as is often required in many prior art devices. This embodiment may include the pilot-flow snap action control device.

Therefore, the present invention provides both a self-contained, fluid operated, snap-action beverage dispenser which is devoid of any electrically powered components and/or a beverage dispenser wherein the flavoring constituent is provided in individual packets. When used for carbonated beverages, it is contemplated that this invention may be used in combination with my copending application, Ser. No. 578,169, entitled: "Instantaneous Carbonator Method and Apparatus", filed May 14, 1975. Together these systems provide a completely portable system for making carbonated beverages from any available source of tap water.

BRIEF DESCRIPTION OF THE DRAWINGS

FIG. 1 is a side plan view of a beverage dispenser according to the teachings of the present invention.

FIG. 2 is a rear plan view of the beverage dispenser of FIG. 1.

FIG. 3 is a section view taken at line 3—3 of FIG. 2.

FIG. 4 is a section view taken at line 4—4 of FIG. 3.

FIG. 5 is a section view taken at line 5—5 of FIG. 3.

DETAILED DESCRIPTION OF THE PREFERRED EMBODIMENTS

Figure 6:
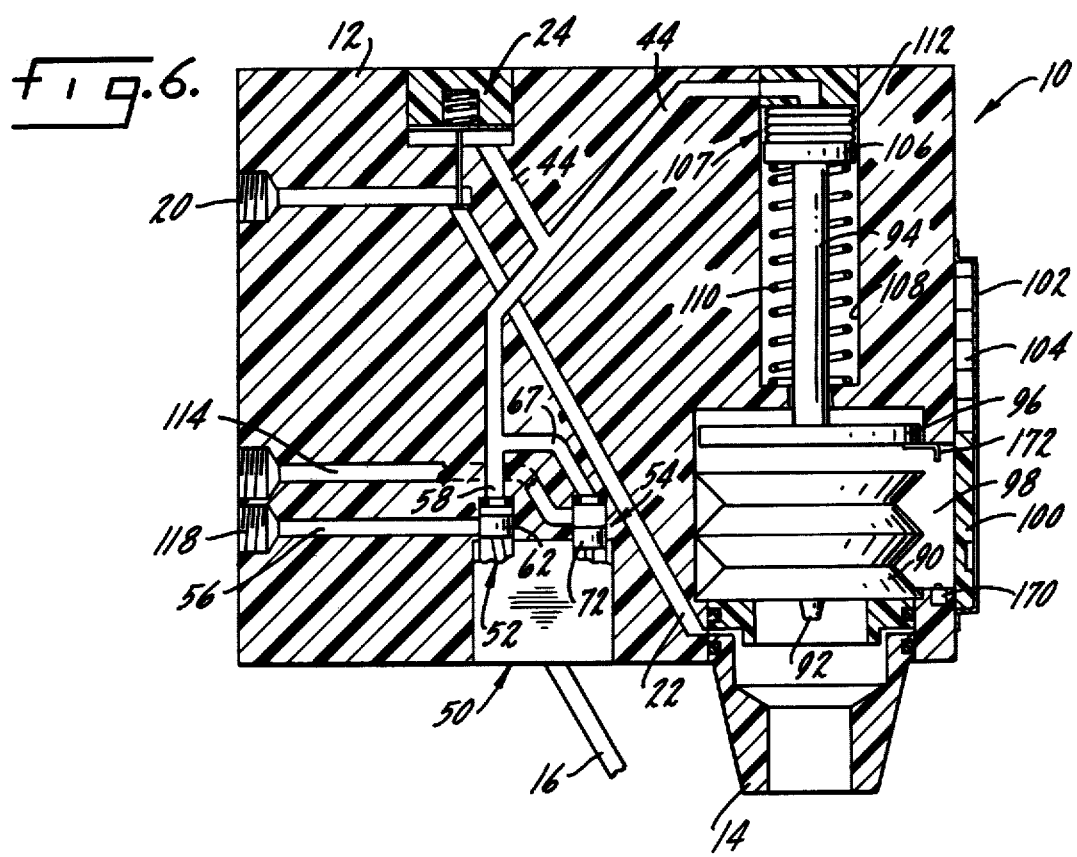
FIG. 6 is a view similar to FIG. 3, illustrating a second embodiment incorporating the teachings of the present invention.

The beverage dispenser 10 includes a housing 12 having a mixing nozzle 14 through which a beverage consisting of measured, thoroughly mixed quantities of a liquid base and a flavoring constituent is dispensed into an open-topped container such as the glass 18. An actuating lever 16 depends from housing 12 and is engaged by container 18 as it is advanced in the direction of arrow A into position under the mixing nozzle 14. The lever 16 is shown in the fully advanced position in FIG. 3, at which time the beverage dispenser is actuated and the mixed beverage flows from nozzle 14 into the container 18.

The liquid base is introduced into the beverage dispenser at inlet 20. The flow of the base from inlet 20 to the mixing nozzle 14 via the fluid passageway or tube 22 is controlled by control valve 24. The flavoring constituent such as a liquid syrup or the like is introduced into the beverage dispenser from a remote source at inlet 26 and flows through a tube 28 from the inlet 26 to a flavoring control valve 30 adjacent the mixing nozzle. When the control valves 24 and 30 are opened, as shown in FIG. 3, the proper amount of base liquid and flavoring constituent flow into chambers 23 and 29 and through tubes 22 and 28, respectively, into the mixing nozzle where they are mixed and then expelled into container 18.

In a typical case, the base liquid is a carbonated water and the flavoring constituent is a soft drink syrup or the like wherein a 5:1 ratio of water to syrup is required to produce the proper mixture. The rate of flow of the base liquid and a constituent into the mixing nozzle 14 may be controlled by controlling the rate of the flow from the respective sources connected at inlets 20 and 26 through chambers 23 and 29 and tubes 22 and 28, respectively.

Initially, the valves 24 and 30 are in a normally closed position for inhibiting the flow of liquid base and flavoring constituent to the mixing nozzle. The valves each comprise a sealed, displaceable piston enclosure having a plunger 32 with a cylindrical member 34 which is movable between an advanced position (not shown) closing the flow from chambers 23 and 29 into tubes 22 and 28, respectively, and a retracted position (FIG. 3) opening chambers 23 and 29 to tubes 22 and 28. Each valve includes a compression spring 36 which serves as bias means for normally urging the plunger 32 and member 34 into the advanced, closed position. In the illustrated embodiment, the upper end of each plunger 32 includes an enlarged flange 38 in abutting relationship with a sealing diaphragm 40 for maintaining a fluid-tight seal between the plunger and the bias spring 36.

The plunger is housed within a chamber 42 which is in direct communication with control line 44. It will be seen that when fluid under pressure is present in control line 44, the biasing force of each spring 36 is overcome and each plunger 32 and member 34 are moved upwardly into the retracted position (FIG. 3) for introducing a flow of base liquid and flavoring constituent into lines 22 and 28, respectively, and into the mixing nozzle 14. Conversely, when the pressure in control line 44 is relieved, the bias spring 36 urges each plunger 32 and member 34 downwardly into the advanced position for stopping flow through line 22 or 28.

A snap-action pilot valve assembly 50 defines the control device for controlling the pressure of fluid in the control line 44. The device includes a pair of displaceable piston enclosures 52 and 54. The chamber of enclosure 52 includes an inlet in direct communication with the source of base liquid via line 56 and an outlet 58 in communication with the control line 44. Plunger 60 includes member 62 which is movable between the retracted position of FIG. 3 and an advanced position (not shown) for alternately introducing or inhibiting the flow of base liquid from the source at 20 to the control line 44. The chamber of piston enclosure 54 has an outlet in direct communication with nozzle 14 via flow line 66 and an inlet 67 in communication with control line 44. The plunger 70 includes member 72 which is movable between the advanced position of FIG. 3 and a retracted position (not shown) for alternatively inhibiting and introducing flow of the base liquid in the control line to the nozzle via drain 66. The respective positions of plungers 60 and 70 are controlled by the snap-action switch 74 and the actuating lever 16. The actuating lever is pivotable about pin 76 and has an upper end 78 in communication with the contoured saddle 80 on switch 74. Spring 82 operates as an over-center spring and maintains the switch in either of two positions, depending on the position of lever 16. The plungers 60 and 70 are coupled to the switch 74, wherein alternate plungers are advanced and retracted depending upon the position of the switch.

When lever 16 is in the retracted position shown in FIG. 1, the switch is disposed such that plunger 60 is advanced into the chamber of piston enclosure 52 for inhibiting the flow of base liquid into control line 44. Conversely, plunger 70 is retracted and the control line 44 is open to drain 66 through line 68 and enclosure 54. This relieves the pressure in the control line, whereby springs 36 operate to close valves 24 and 30.

When the container 18 is advanced into engagement with lever 16, the lever is advanced to the position of FIG. 3 and switch 74 is tripped, instantaneously opening the chamber of enclosure 52 and closing the chamber 34 of enclosure 54. This introduces a flow of base liquid from the source coupled at 20 into control line 44 via line 56 and enclosure 52, thereby increasing the pressure of the fluid in the control line for raising the members 34 of valves 24 and 30, respectively, for introducing a flow from the respective sources at 20 and 26 into the mixing nozzle 14. When the container is filled with the desired amount of beverage, it is retracted and biasing means such as tension spring 84 moves the actuating lever 16 to the retracted position of FIG. 1, thereby tripping switch 74 and closing the chamber of enclosure 52 to flow of base liquid while conversely opening the chamber of enclosure 54 to drain 66 permitting the pressure in control line 44 to be relieved. Since the control fluid in the present embodiment is base liquid, it is convenient to communicate drain line 66 with nozzle 14, whereby any liquid drained from control line 44 is discharged into the container 18 as the container is retracted from the dispenser.

Figure 7:
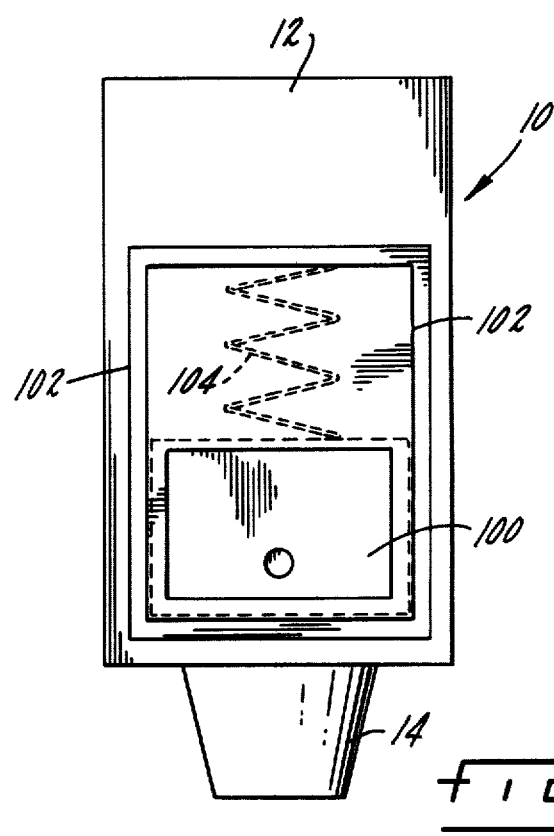
FIG. 7 is a front view of the embodiment illustrated in FIG. 6.

A second embodiment of the present invention is illustrated in FIGS. 6 and 7. Components which operate in the same manner as like components of the embodiment shown in FIGS. 1 - 5 have been identified by the same reference numerals. As shown in FIGS. 6 and 7, the source of flavoring constituent comprises a sealed, collapsible packet 90 having a weakened, sealed outlet at nipple 92. Flow of the flavoring constituent into nozzle 14 is controlled by an elongated plunger 94 having an enlarged lower flange 96 which may be advanced into the packet 90 by introducing fluid under pressure into control line 44. This compresses the packet, breaks the seal in the nipple 92 and expels the contents of the packet into mixing nozzle 14.

The dispenser of FIGS. 6 and 7 may include the snap-action pilot valve arrangement of FIGS. 1 - 5. It should, however, be understood that this arrangement is optional and that other activating devices may be employed.

The beverage dispenser 10 has been modified to include a chamber 98 which accommodates the flavoring packet 90. An access door 100 is provided in the housing of the dispenser and is in communication with chamber 98, whereby individual serving packets are placed in the dispenser for mixing a selected beverage. In the embodiment shown, the access door is slidable along a pair of vertical ways 102 and is normally urged into the closed position by biasing means such as the compression spring 104. The lower flange 96 of plunger 94 is in communication with the packet chamber 98. Plunger 94 also includes an enlarged upper flange 106 which is in communication with a control mechanism 107. The plunger 94 and flange 106 are housed in an elongated cylinder 108. A constant compression spring 110 is disposed within cylinder 108 and is in communication with the lower side of flange 106 for normally urging the plunger into the position shown in FIG. 6, whereby the flange 96 is retracted from the packet chamber 98. A collapsible, fluid-tight bellows 112 engages the upper edge of flange 106 and is in fluid communication with the control line 44. When the control line 44 is under pressure, bellows 112 is expanded and advances plunger 94 and flange 96 into packet chamber 98, thereby compressing the packet 90 and expelling the contents thereof through nipple outlet 92 into mixing nozzle 14. When the control line 44 is open to drain, spring 110 acts against flange 106, thereby collapsing the bellows 112 and expelling the control fluid therefrom into line 44.

It should, of course, be understood that the bellows 112 is utilized to maintain complete fluid isolation between cylinder 108 and control line 44, thereby keeping the piston enclosure including cylinder 108 free of contamination.

The individual serving packet 90 permits a wide variety of flavoring constituents to be utilized without increasing the need of additional apparatus to accommodate a plurality of flavoring constituent sources. In addition, the packet permits the change from one flavoring constituent to another in successive operations of the beverage dispenser without any danger of contaminating any portion of the dispenser in advance of the mixing nozzle 14 with residual flavoring constituent which may have a detrimental effect on subsequent mixed beverages.

An additional feature of the embodiment of FIGS. 6 and 7 is provided by incorporating the micro-switch 170 which is in communication with the tab 172 on the lower flange 96 of plunger 94. The micro-switch 170 is actuated by plunger 94 when flange 96 is advanced to its fully extended position, indicating that all the contents of the packet 90 have been expelled into nozzle 14. The micro-switch is coupled in the known manner to the source of base liquid and stops the flow of base liquid into nozzle 14 and ensures that the proper ratio of base liquid to flavoring constituent is introduced into the mixing nozzle 14 for each individual serving, even though the container is not immediately retracted from actuating lever 16.

As illustrated, the embodiment of FIGS. 6 and 7 also includes a pilot valve assembly 50 which may be connected to either the base liquid source as in FIGS. 1 - 5 or in the alternative to a separate and independent pilot source 118, without fear of contaminating the mixed beverage with fluid draining from the pilot control line 44. As shown, the drain side of the piston enclosure 54 is connected to an exhaust line 114 which is independent of the mixing nozzle 14. Also, the source of base liquid which is controlled by valve 24 may be independent of the source 118 which is in communication with the input line 56 to the pilot valve 50. This is particularly advantageous when the base liquid is a carbonated water for mixing soft drinks and the like. A standard water supply may be utilized to control the operation of pilot valve 50, and the standard water supply may be also input to a carbonator such as the instantaneous carbonator shown and described in the inventor's copending application, Ser. No. 578,169 entitled: "Instantaneous Carbonator Method and Apparatus", filed May 14, 1975. It should, of course, be understood that the particular pilot valve arrangement of FIGS. 1 - 5 may be utilized with the packet dispenser apparatus of FIGS. 6 and 7 without departing from the scope and spirit of the present invention.

What is claimed is:

1. A method of dispensing a mixed beverage constituting measured quantities of a base liquid and a flavoring constituent wherein a controlled flow of base liquid and a controlled flow of flavoring constituent are selectively directed to a beverage outlet and thereafter expelled from the outlet into a suitable container, the method comprising the steps of:
   a. selectively and manually actuating a pilot flow of base liquid under pressure;
   b. introducing said pilot flow into each of a plurality of flow valves, one each associated with independent sources of base liquid and flavoring constituent, for independently activating a flow of base liquid and a flow of flavoring constituent to the beverage outlet; and
   c. deactivating said pilot flow for inhibiting the flow of base liquid and flavoring constituent to the beverage outlet.

2. The method of claim 1, which includes the step of exhausting the pilot flow of base liquid to the beverage outlet after step "c."

3. A method of dispensing a mixed beverage consisting of a flavoring constituent packaged in an individual serving portion and a base liquid, wherein a controlled quantity of the base liquid is mixed with the flavoring constituent as it is released from a beverage outlet; the flavoring constituent and base liquid being expelled from the outlet into a suitable container, the method comprising the steps of:
   a. placing a sealed, collapsible package of flavoring constituent intermediate the beverage outlet and a means selectively operable for exerting a force on the package to collapse the package, break the seal and expel the contents thereof in a controlled flow to the outlet;
   b. actuating the means operable to collapse the package, break the seal, and expel the contents of the package to the outlet;
   c. simultaneously introducing a flow of base liquid to the beverage outlet; and
   d. inhibiting the flow of base liquid to the beverage outlet when the flavoring constituent has been completely expelled from the package.

4. The method of claim 3, wherein a constant force is applied in step b, controlling the flow of flavoring constituent to the outlet.

5. The method of claim 3, which includes a step of removing the collapsed, emptied package after the contents thereof have been expelled.

6. The method of claim 3, which includes the steps of:
  a. introducing a pilot flow of fluid under pressure for triggering the flow of base liquid to the outlet and for actuating the means operable to collapse the package; and
  b. discontinuing the said pilot flow of fluid after step "d."

7. The method of claim 6, wherein the pilot flow of fluid comprises base liquid.

8. A fluid activated beverage dispenser for dispensing a beverage consisting of measured quantities of a base liquid and a flavoring constituent, comprising:
  a. a beverage outlet;
  b. a source of pressurized base liquid in communication with said outlet;
  c. a chamber in communication with the said outlet;
  d. a portable, sealed packet receivable by said chamber and having a normally closed opening in communication with said outlet, the packet containing a measured serving of flavoring constituent; and
  e. actuating means associated with said chamber for simultaneously generating the flow of base liquid into the outlet and opening the sealed packet for expelling the contents of the packet to the beverage outlet.

9. The beverage dispenser of claim 8, wherein said actuating means includes:
  a. means associated with said chamber and actuable in response to a flow of fluid under pressure for opening the sealed packet and expelling the contents of the packet to the outlet;
  b. a normally closed valve associated with the source of base liquid and movable from the normally closed position to an open position in response to a flow of fluid under pressure for controlling the flow of liquid base to the outlet; and
  c. a fluid control device in communication with the said actuating means and the said valve for selectively introducing a flow of fluid under pressure thereto.

10. The beverage dispenser of claim 9, wherein the actuating means is movable between a fully retracted position and a fully advanced position, the contents of said packet being fully expelled to the beverage outlet when said actuating means is in the fully advanced position, and wherein the beverage dispenser includes means associated with and responsive to movement of said actuating means to the fully advanced position for closing the valve and inhibiting the flow of base liquid.

11. The beverage dispenser of claim 9, including:
  a. a mechanical actuator associated with the control device and movable from a retracted position to an advanced position for instantaneously shifting said control device from the second position to the first position; and
  b. biasing means associated with said actuator for normally maintaining the said actuator in the retracted position.

12. The beverage dispenser of claim 9, the control device including exhaust means associated with each of the valves for draining the liquid base supplied by the control device from said valves when said control device is in the second position.

13. The beverage dispenser of claim 12, including means associated with the exhaust means for returning the drained base liquid to the source of pressurized base liquid.

14. The beverage dispenser of claim 9, wherein the said chamber is disposed intermediate the beverage outlet and the actuating means, and wherein the packet comprises a sealed, collapsible enclosure having a sealed, frangible opening which will open in response to placing the contents of the packet under pressure, the actuator comprising:
  a. a displaceable piston enclosure having a plunger movable between an advanced position and a retracted position, the plunger having one end in communication with the said chamber and the other end in communication with the said control device;
  b. biasing means exerting a force against the plunger for normally urging the plunger into a retracted position out of the said chamber; and
  c. means in communication with the said other end of the plunger for supplying fluid under pressure from said control device to said plunger for advancing the plunger from the retracted position to the advanced position.

15. The beverage dispenser of claim 14, wherein the last mentioned means comprises expandable bellows in communication with the said other end of the plunger, said bellows in fluid communication with the control device and expandable from a collapsed condition in response to the flow of pressurized fluid supplied by the control device for engaging and advancing said plunger.

16. The beverage dispenser of claim 15, wherein said bellows comprises means for completely isolating the fluid supplied by the control device from the said chamber and from the actuating means associated with said chamber.

17. A fluid activated beverage dispenser for dispensing a beverage consisting of measured quantities of a base liquid and a flavoring constituent, comprising:
  a. a beverage outlet;
  b. a source of pressurized base liquid and at least one independent source of flavoring constitutent in communication with said beverage outlet;
  c. an independent, normally closed valve associated with each of said sources, each of said valves movable from the normally closed position to an open position in response to a flow of liquid under pressure for controlling flow of base liquid and flow of flavoring constituent from the respective sources to the beverage outlet; and
  d. a control device in communication with the source of pressurized base liquid, said control device selectively movable between a first position introducing a constant flow of pressurized base liquid to said valves and a second position inhibiting said constant flow, said control device being normally disposed in the second position.

18. The beverage dispenser of claim 17, including:
  a. a mechanical actuator associated with the control device and movable from a retracted position to an advanced position for instantaneously shifting said control device from the second position to the first position; and
  b. biasing means associated with said actuator for normally maintaining the said actuator in the retracted position.

19. The beverage dispenser of claim 17, the control device including exhaust means associated with each of the valves for draining the liquid base supplied by the control device from said valves when said control device is in the second position.

20. The beverage dispenser of claim 19, including means associated with the exhaust means for introducing the drained liquid base to the beverage outlet.

21. The beverage dispenser of claim 17, each of said valves comprising:
   a. a displaceable piston enclosure each having a plunger movable between the advanced position inhibiting the flow of base liquid and flavoring constituent from the respective sources to the beverage outlet and a retracted position actuating the flow from the respective sources to the beverage outlet, each of said plungers movable from the advanced position to the retracted position in response to the flow of pressurized liquid base supplied when the control device is in the first position.

22. The beverage dispenser of claim 21, including biasing means associated with each of said piston enclosures, exerting a constant force on the plungers thereof for continuously urging the plungers into the advanced position.

23. The beverage dispenser of claim 22, the control device being a pilot valve comprising:
   a. a pair of displaceable piston enclosures movable between an open flow-generating position and a closed flow-inhibiting position, one of said piston enclosures in communication with the source of pressurized liquid base and the other of said piston enclosures in communication with an exhaust;
   b. trip means associated with each of said plungers and shiftable between first and second positions for disposing alternate plungers in the open and closed positions respectively;
   c. a mechanical actuator movable between advanced and retracted positions for instantaneously shifting the trip means between said first and second positions.

24. The beverage dispenser of claim 23, wherein the plunger in communication with the source of liquid base is in the closed position when the actuator is retracted, and wherein the control device includes means normally biasing the actuator in the retracted position.

25. The beverage dispenser of claim 17, including means associated with the source of pressurized liquid base for carbonating the base liquid before it is introduced to the beverage outlet.

26. The beverage dispenser of claim 18, wherein said mechanical actuator comprises a lever pivotable relative to said beverage outlet and adapted for engagement by a beverage receptacle, the receptacle being disposed in communication with the beverage outlet when the lever is engaged by the receptacle and disposed in the advanced position.

27. The method of claim 1, wherein in step "b" the flow of base liquid and the flow of flavoring constituent to the beverage outlet is simultaneously activated.

28. The method of claim 1, wherein a plurality of sources of flavoring constituent are provided and there is included prior to step "a" the step of selecting one of said sources of flavoring constituent.

29. A method of dispensing a mixed beverage consisting of a flavoring constituent packaged in an individual serving portion and a base liquid, wherein a controlled quantity of the base liquid is mixed with the flavoring constituent as it is released from a beverage outlet, the flavoring constituent and base liquid being expelled from the outlet into a suitable container, the method comprising the steps of:
   a. placing an individual serving portion of flavoring constituent intermediate the beverage outlet and the means for discharging the flavoring constituent to the beverage outlet;
   b. actuating the means for discharging the flavoring constituent to the beverage outlet; and
   c. simultaneously introducing a controlled quantity of base liquid to the beverage outlet.

* * * * *